United States Patent
Nagasawa et al.

(10) Patent No.: US 8,678,429 B2
(45) Date of Patent: Mar. 25, 2014

(54) OCCUPANT PROTECTION DEVICE

(75) Inventors: Isamu Nagasawa, Tokyo (JP); Noriyoshi Baba, Tokyo (JP); Tetsuya Nakase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/524,394

(22) Filed: Jun. 15, 2012

(65) Prior Publication Data

US 2013/0001934 A1 Jan. 3, 2013

(30) Foreign Application Priority Data

Jun. 30, 2011 (JP) ................. 2011-146837

(51) Int. Cl.
*B60R 21/203* (2006.01)
(52) U.S. Cl.
USPC .......................................... 280/731; 280/729
(58) Field of Classification Search
USPC .......................................... 280/731, 729, 732
See application file for complete search history.

(56) References Cited

U.S. PATENT DOCUMENTS

| | | | |
|---|---|---|---|
| 5,240,283 A | 8/1993 | Kishi et al. | |
| 5,253,892 A | 10/1993 | Satoh | |
| 5,310,214 A | 5/1994 | Cuevas | |
| 5,358,273 A | 10/1994 | Onishi et al. | |
| 5,486,019 A * | 1/1996 | Chevroulet et al. | 280/730.1 |
| 5,529,337 A | 6/1996 | Takeda et al. | |
| 5,556,128 A | 9/1996 | Sinnhuber et al. | |
| 5,560,649 A | 10/1996 | Saderholm et al. | |
| 5,575,497 A * | 11/1996 | Suyama et al. | 280/730.1 |
| 5,626,359 A | 5/1997 | Steffens et al. | |
| 5,992,875 A | 11/1999 | Cundill | |
| 6,139,052 A | 10/2000 | Preamprasitchai | |
| 6,195,008 B1 | 2/2001 | Bader | |
| 6,290,257 B1 | 9/2001 | Bunce et al. | |
| 6,419,262 B1 | 7/2002 | Fendt et al. | |
| 6,550,804 B2 | 4/2003 | Burdock | |
| 6,581,961 B1 | 6/2003 | Bowers | |
| 6,594,570 B2 | 7/2003 | Nagao et al. | |
| 6,709,009 B1 | 3/2004 | Michael et al. | |
| 6,893,044 B2 | 5/2005 | Holmes et al. | |
| 7,040,650 B2 * | 5/2006 | Neupert et al. | 280/729 |
| 7,070,201 B2 | 7/2006 | Song et al. | |
| 7,401,807 B2 | 7/2008 | Breed et al. | |
| 7,426,429 B2 | 9/2008 | Tabe | |
| 7,663,502 B2 | 2/2010 | Breed | |
| 7,793,973 B2 | 9/2010 | Sato et al. | |
| 7,890,263 B2 | 2/2011 | Prakah-Asante et al. | |
| 8,179,254 B2 | 5/2012 | Hyde et al. | |

(Continued)

FOREIGN PATENT DOCUMENTS

| | | | |
|---|---|---|---|
| JP | 2006-69384 | 3/2006 | |
| WO | WO 93/16902 | * 9/1993 | 280/731 |

*Primary Examiner* — Ruth Ilan
(74) *Attorney, Agent, or Firm* — Smith, Gambrell & Russell, LLP.

(57) ABSTRACT

There is provided an occupant protection device. An airbag device includes an airbag that is stored in a center pad of a steering wheel of a vehicle and is expandable toward an occupant side upon a collision of the vehicle. The center pad is disposed to have a non-rotating structure independent from the steering wheel. The airbag includes a first extension portion and a second extension portion which are disposed at opposing edges of the airbag in a width direction of the vehicle and are expandable to extend toward a rear side of the vehicle.

13 Claims, 12 Drawing Sheets

(56) References Cited

U.S. PATENT DOCUMENTS

| | | |
|---|---|---|
| 8,260,502 B2 | 9/2012 | Yonak et al. |
| 8,333,406 B2 | 12/2012 | Slaats |
| 2002/0043789 A1 | 4/2002 | Lichtinger et al. |
| 2004/0163871 A1 | 8/2004 | Nobusawa |
| 2004/0178612 A1 | 9/2004 | Tabe |
| 2005/0184489 A1 | 8/2005 | Kobayashi |
| 2005/0236817 A1 | 10/2005 | Sonoda et al. |
| 2005/0275201 A1* | 12/2005 | Schneider et al. ............ 280/731 |
| 2006/0163848 A1* | 7/2006 | Abe .............................. 280/729 |
| 2006/0197324 A1 | 9/2006 | Klinkenberger |
| 2006/0232050 A1 | 10/2006 | Kumagai et al. |
| 2006/0244251 A1 | 11/2006 | Muller |
| 2006/0284400 A1 | 12/2006 | Sakakibara et al. |
| 2007/0267852 A1 | 11/2007 | Enders |
| 2008/0054602 A1 | 3/2008 | Yang |
| 2008/0179864 A1 | 7/2008 | Nishizawa |
| 2009/0039625 A1 | 2/2009 | Breed |
| 2009/0121462 A1* | 5/2009 | Rick ............................ 280/729 |
| 2010/0213692 A1 | 8/2010 | Nagai et al. |
| 2012/0065843 A1 | 3/2012 | Thomas et al. |
| 2012/0296567 A1 | 11/2012 | Breed |
| 2013/0001935 A1* | 1/2013 | Nagasawa et al. ............ 280/731 |
| 2013/0001936 A1 | 1/2013 | Nagasawa et al. |

* cited by examiner

OCCUPANT PROTECTION DEVICE

CROSS REFERENCE TO RELATED APPLICATIONS

The present application claims priority from Japanese Patent Application No. 2011-146837 filed on Jun. 30, 2011, the entire contents of which are hereby incorporated by reference.

BACKGROUND OF THE INVENTION

1. Field of the Invention

The present invention generally relates to occupant protection devices, and particularly relates to an occupant protection device in which an airbag is stored in a center pad of a steering wheel.

2. Description of the Related Art

There is known an occupant protection device in which an airbag is stored in a folded state in a center pad of a steering wheel and the airbag expands from the center pad toward an occupant in response to an impact due to a collision of a vehicle so as to protect the occupant from the impact.

The center pad of the steering wheel usually rotates together with the steering wheel in accordance with driving operations performed by an occupant. Therefore, the airbag stored in the center pad is formed in a circular shape so as to be expandable in the same shape at any steering angle of the steering wheel. The airbag having a circular shape mainly protects the head of the occupant.

In recent years, there has been an increasing demand for an airbag that is stored in a steering wheel and is capable of not only protecting the head of an occupant but also sufficiently protecting other parts of the body. In particular, if a seat belt lies across the chest of an occupant, the seat belt might compress the chest of the occupant upon a vehicle being subjected to an impact.

In view of the foregoing, for example, Japanese Unexamined Patent Application Publication (JP-A) No. 2006-069384 discloses, as an airbag device capable of protecting not only the head of an occupant but also other parts of the body, an airbag device for an automobile in which an airbag is disposed in a center pad having a non-rotating structure and includes a head protection portion, a chest protection portion, and an abdomen protection portion.

According to JP-A No. 2006-069184, there may be a case in which an occupant is protected from an impact due to a collision of a vehicle by a portion in the vicinity of a periphery of the airbag, and there may be another case in which an occupant is protected by a portion in the vicinity of a center of the airbag, for example. More specifically, if the collision of the vehicle that has caused the impact is a front collision, it is highly likely that the occupant will be protected by the portion in the vicinity of the center of the airbag.

On the other hand, if the collision of the vehicle that has caused the impact is a side collision, it is highly likely that the occupant will be protected by the portion in the vicinity of the periphery of the airbag. Therefore, in the case where the occupant is protected by the portion in the vicinity of the center of the airbag, the impact value of the impact caused by the collision of the vehicle can be reduced. However, in the case where the occupant is protected by the portion in the vicinity of the periphery of the airbag, it may be difficult to reduce the impact value.

As can be appreciated, in the case of the airbag device of JP-A No. 2006-069384, the impact value of an impact exerted on an occupant may vary depending on the manner of the collision. That is, in the case of the airbag device of JP-A No. 2006-069384, although the airbag sufficiently protects the chest and abdomen of an occupant as described above, the occupant is not always protected by the portion in the vicinity of the center of the airbag. Thus the airbag still has room for improvement with regard to enhancing safety.

SUMMARY OF THE INVENTION

Accordingly, it is an object of the present invention to provide an occupant protection device that makes the impact values in different types of collision more uniform and thereby provides improved safety in protecting an occupant from an impact due to a collision of a vehicle.

According to an aspect of the present invention, there is provided an occupant protection device including: an airbag that is stored in a center pad of a steering wheel of a vehicle and is expandable toward an occupant side upon an impact due to a collision of the vehicle, wherein the center pad is disposed to have a non-rotating structure independent from the steering wheel; and wherein the airbag includes an extension portion disposed on at least one edge of the airbag in a width direction of the vehicle and expandable to extend toward a rear side of the vehicle.

Further, in the occupant, protection device according to the above aspect of the present invention, the airbag may further include at least a head protection portion that protects a head of the occupant, and a chest protection portion that protects a chest of the occupant; and the extension portion may be disposed in the head protection portion.

Further, in the occupant protection device according to the above aspect of the present invention, the head protection portion and the chest protection portion may be expandable to have different thicknesses from each other in a front-rear direction of the vehicle.

Further, in the occupant protection device according to the above aspect of the present invention, the extension portions may be disposed at opposing edges of the airbag in the width direction of the vehicle and may be expandable to cover a head of an occupant.

Further, in the occupant protection device according to the above aspect of the present invention, the extension portion may be disposed at an outdoor-side edge of the airbag in the width direction of the vehicle and may be expandable between an occupant and a window of the vehicle.

Further, the occupant protection device according to the above aspect of the present invention, the extension portion may be disposed at a cabin-side edge of the airbag in the width direction of the vehicle and may be expandable between an occupant in a driver seat and an occupant in a passenger seat.

According to the above aspect of the present invention, the safety in protecting an occupant from an impact due to a collision of vehicle can be improved by making the impact values in different types of collision more uniform.

DETAILED DESCRIPTION OF THE INVENTION

Exemplary embodiments of the present invention will be described below with reference to the accompanying drawings.

Embodiment 1

An airbag device (occupant protection device) 10 of Embodiment 1 of the present invention is stored in a center pad 7 of a steering wheel 3.

Figure 1:
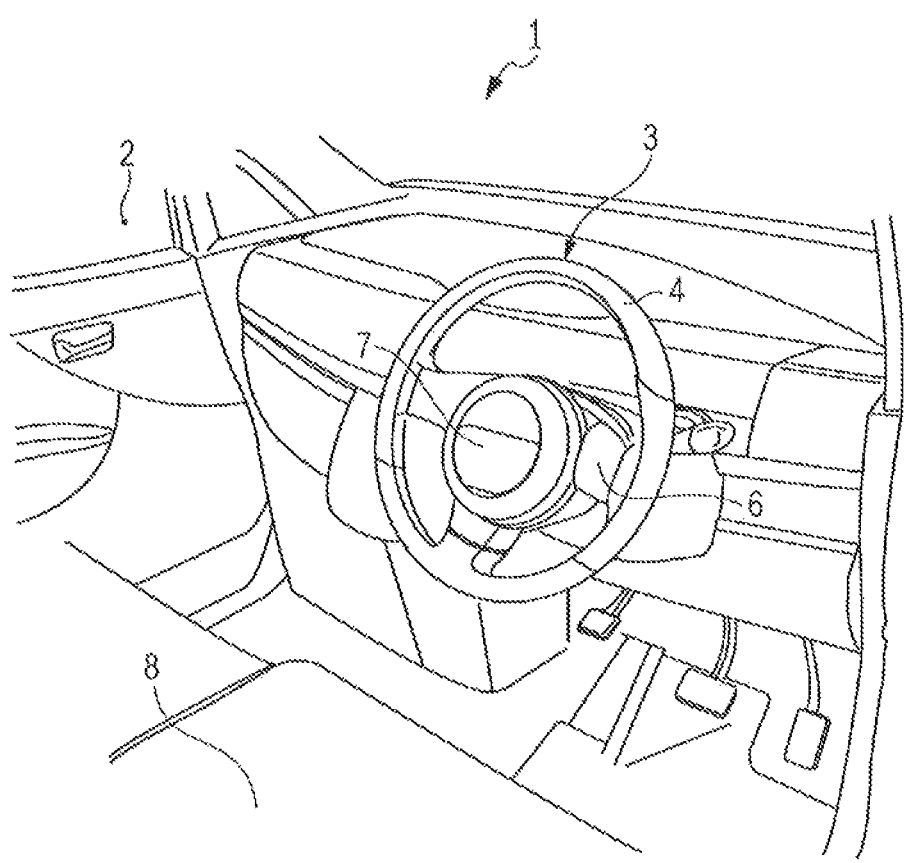
FIG. 1 is a schematic view showing a cabin of a vehicle to which an occupant protection device of Embodiment 1 of the present invention is applied, and more specifically is a perspective view showing the cabin as viewed from the rear toward the front of the vehicle.

First, a description is given of the steering wheel 3 of a vehicle 1 to which the airbag device 10 of Embodiment 1 of the present invention is applied with reference to FIG. 1. FIG. 1 is a schematic view showing a cabin 2 of the vehicle 1 to which the airbag device 10 of Embodiment 1 of the present invention is applied. More specifically, FIG. 1 is a perspective view showing the cabin 2 as viewed from the rear toward the front of the vehicle 1.

As illustrated in FIG. 1, the steering wheel 3 of this embodiment includes a ring-shaped rim 4 forming an outer frame of the steering wheel 3, spokes 6 connecting the rim 4 and a steering shaft 5, and a center pad 7 provided separately from the steering shaft 5 and supported so as to have an independent non-rotating structure.

That is, the center pad 7 of this embodiment is configured to have a non-rotating structure that is not involved in steering operations of the rim 4 performed by an occupant M. The airbag device 10 is stored inside the center pad 7.

In a case where the center pad 7 of the steering wheel 3 has a rotating structure, an airbag 11 stored in the center pad 7 is formed in a circular shape so as to be operable at any steering angle of the steering wheel 3.

Meanwhile, as described above, the steering wheel 3 of this embodiment is configured such that the center pad 7 has a non-rotating structure. Therefore, the shape of the airbag 11 stored in the center pad 7 can be set in advance. It should be noted that, as described above, the center pad 7 of the steering wheel 3 of this embodiment is disposed in the steering wheel 3 so as to have a non-rotating structure. However, the structure of the center pad 7 is not limited to a non-rotating structure and may have any structure that brings the center pad 7 back to a neutral position upon expansion of the airbag 11.

Figure 2:
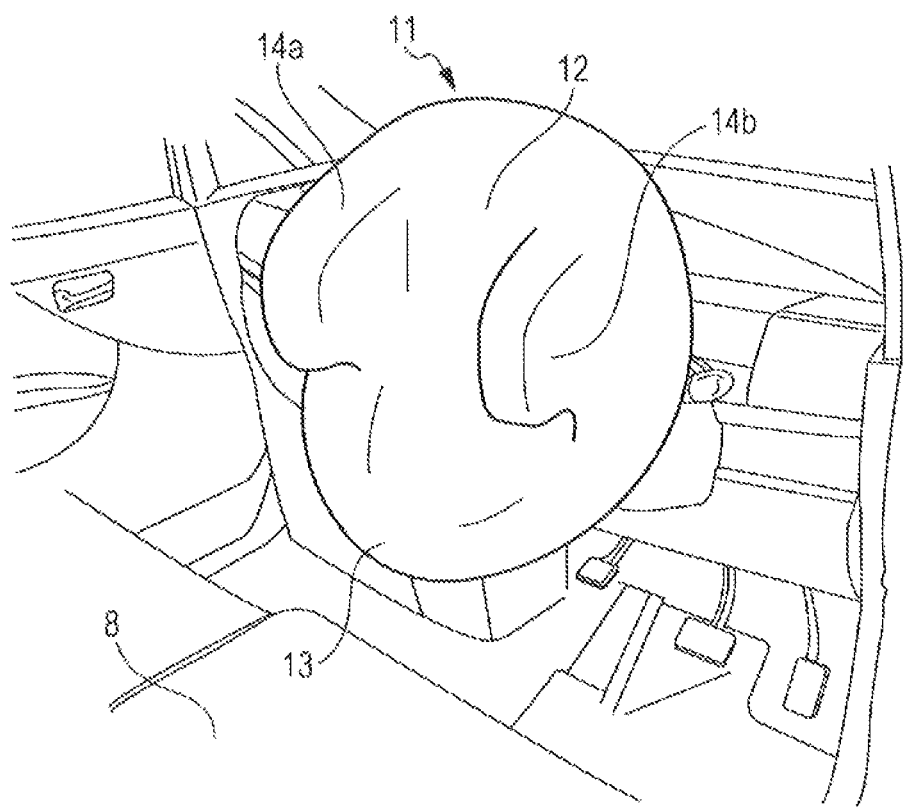
FIG. 2 is a perspective view showing an airbag of the occupant protection device in an inflated and expanded state according to FIG. 1.
Figure 3:
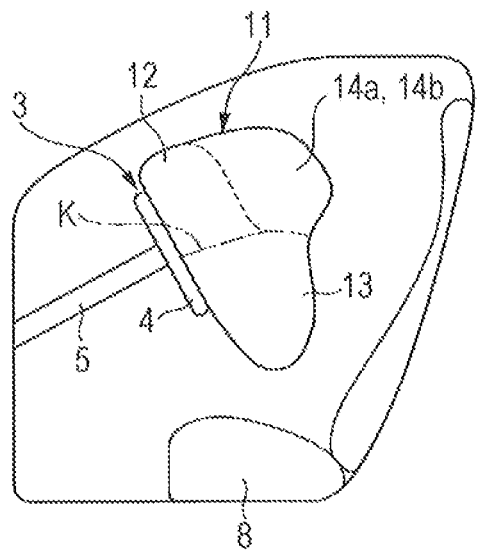
FIG. 3 is a schematic view showing the cabin of the vehicle to which the occupant protection device of Embodiment 1 of the present invention is applied, and more specifically is a side view showing the airbag of the occupant protection device in the inflated and expanded state when the vehicle is viewed from one side in a width direction of the vehicle.

Next, a description is given of the airbag 11 of the airbag device 10 of this embodiment with reference to FIGS. 2 and 3. FIG. 2 is a perspective view showing the airbag 11 of the airbag device 10 in an inflated and expanded state according to FIG. 1.

Further, FIG. 3 is a schematic view showing the cabin 2 of the vehicle 1 to which the airbag device 10 of Embodiment 1 of the present invention is applied. More specifically, FIG. 3 is a side view showing the airbag 11 of the airbag device 10 in the inflated and expanded state when the cabin 2 is viewed from one side in a width direction of the vehicle 1.

As illustrated in FIGS. 2 and 3, the airbag 11 of this embodiment includes a first chamber (head protection chamber) 12 that protects the head of the occupant M, and a second chamber (chest protection chamber) 13 that protects the chest of the occupant M.

Further, although the airbag 11 includes the first chamber 12 an the second chamber 13 as mentioned above, the space of the first chamber 12 and the space of the second chamber 13 are integrated with and in communication with each other.

It should be noted that, although the airbag 11 of this embodiment has a configuration in which the space of the first chamber 12 and the space of the second chamber 13 are integrated with and in communication with each other, the configuration of the airbag 11 is not limited to this configuration. For example, the airbag 11 may have a pressure valve at a communication portion between the first chamber 12 and the second chamber 13.

In this case, the pressure valve is formed of fabric that is thinner than base fabric of the airbag 11. Thus, when a gas is supplied from an inflator to the airbag 11 and a pressure of one of the chambers becomes high, the pressure valve tears. Thus, the gas supplied from the inflator is then supplied from one of the chambers to the other one of the chambers through the pressure valve.

In this embodiment, the first chamber 12 has a semicircular shape when the first chamber 12 is viewed from the rear toward the front in a front-rear direction of the vehicle 1. The first chamber 12 has a width in the vehicle width direction that is substantially the same as a width of a seat head of a seat 8.

Further, the first chamber 12 has an elliptical shape when viewed from the vehicle width direction. That is, the first chamber 12 is not formed in a shape having corners, much as a rectangular shape, but is formed in an elliptical shape, and serves as a cushion so as to reduce the impact value.

Further, similar to the first chamber 12, the second chamber 13 is formed in a semicircular shape when the second chamber 13 is viewed from the rear toward the front in the vehicle front-rear direction. The second chamber 13 has a width in the vehicle width direction that is substantially the same as the width of a seat back of the seat 8.

Further, the second chamber 13 has an elliptical shape when viewed from the vehicle width direction. That is, the second chamber 13 is not formed in a shape having corners, such as a rectangular shape, but is formed in an elliptical shape, and serves as a cushion so as to reduce the impact value.

As mentioned above, the first chamber 12 and the second chamber 13 are formed in an elliptical shape when the first chamber 12 and the second chamber 13 viewed from the vehicle width direction. However, the first chamber 12 and the second chamber 13 have different projecting lengths toward the occupant M.

More specifically, the second chamber 13 has a greater projecting length toward the occupant M than the first chamber 12. That is, the second chamber 13 for protecting the chest of the occupant M has a greater projecting length toward the occupant M than the first chamber 12 for protecting the head of the occupant M.

Thus, since the second chamber 13 for protecting the chest of the occupant M has a greater projecting length toward the occupant M than the first chamber 12 for protecting the head of the occupant M, it is possible protect the chest of the occupant M at an earlier time at the time of expansion of the airbag 11.

Further, as mentioned above, since the second chamber 13 of this embodiment has substantially the same width as the seat back of the seat 8, it is possible to restrain the entire chest of the occupant M with a surface of the second chamber 13 when the second chamber 13 is expanded.

In this way, the airbag 11 of this embodiment can protect the chest of the occupant M at an earlier time than the head of the occupant M at the time of expansion of the airbag 11, and can reduce compression of the chest by uniformly restraining the entire chest of the occupant M. Therefore, safety when the vehicle 1 is subjected to an impact can be improved.

In this embodiment, a first extension portion 14a and a second extension portion 14b that are inflatable and expandable to extend toward a rear side of the vehicle 1 are formed at the opposing edges of the first chamber 12 of the airbag 11 in the vehicle width direction.

The first extension portion 14a and the second extension portion 14b are formed in the first chamber 12 for protecting the head of the occupant M as described above, and are inflatable and expandable to cover the sides of the head of the occupant M when the first extension portion 14a and the second extension portion 14b are viewed from the vehicle width direction.

Thus, since the first extension portion 14a and the second extension portion 14b of this embodiment are inflatable and expandable to cover the sides of the head of the occupant M, it is possible to more reliably protect the head of the occupant M.

Therefore, even if the head of the occupant M is shifted in the vehicle width direction upon the vehicle 1 being subjected to an impact, it is possible to more reliably protect the head of the occupant M. Thus, safety when the vehicle 1 is subjected to an impact can be improved.

Figure 4:
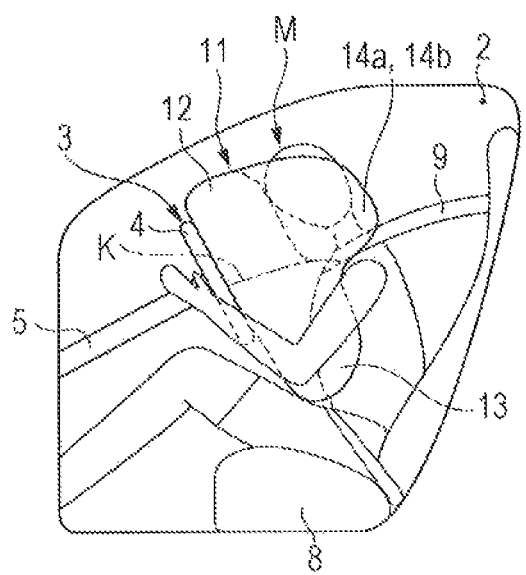
FIG. 4 is a side view illustrating effects of the airbag produced on the occupant upon the vehicle being subjected to an impact according to FIG. 3.
Figure 5:
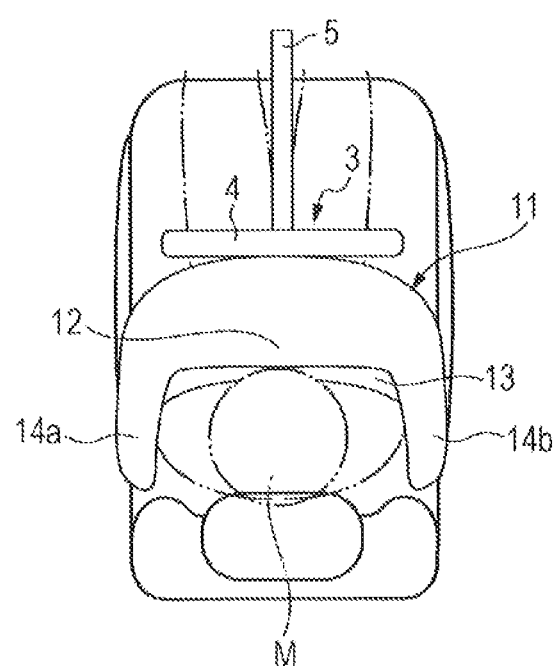
FIG. 5 is a schematic view showing the cabin of the vehicle to which the occupant protection device of Embodiment 1 of the present invention is applied, and more specifically is a top view illustrating effects of the airbag produced on the occupant upon the vehicle being subjected to an impact when the vehicle is viewed from an upper side in a vertical direction of the vehicle.

Next, a description is given of effects of the airbag 11 of the airbag device 10 of this embodiment produced on the occupant M upon expansion of the airbag 11 with reference to FIGS. 4 and 5. FIG. 4 is a side view illustrating effects of the airbag 11 produced on the occupant M upon the vehicle 1 being subjected to an impact according to FIG. 3.

Further, FIG. 5 is a schematic view showing the cabin 2 of the vehicle 1 to which the airbag device 10 of Embodiment 1 of the present invention is applied. More specifically, FIG. 5 is a top view illustrating effects of the airbag 11 produced on the occupant M upon the vehicle 1 being subjected to an impact when the vehicle 1 is viewed from an upper side in a vertical direction of the vehicle 1.

Referring to FIGS. 4 and 5, the airbag 11 of this embodiment is inflated and expanded with a gas supplied from an inflator (not shown). Then, since the airbag 11 has the first chamber 12 and the second chamber 13, the first chamber 12 is inflated and expanded to protect the head, and the second chamber 13 is inflated and expanded to protect the chest.

When the first chamber 12 and the second chamber 13 are inflated and expanded, an inflated length of the second chamber 13 in the vehicle front-rear direction is greater than an inflated length of the first chamber 12 in the vehicle front-rear direction.

Thus, the airbag 11 of this embodiment protects the chest of the occupant M with the second chamber 13 first. The expanded and inflated second chamber 13 has a width in the vehicle width direction that is substantially the same as the width of the seat back of the seat 8.

Therefore, the airbag 11 of this embodiment can protect the chest of the occupant M with the second chamber 13 first. Further, since the airbag 11 protects the occupant M with a surface of the second chamber 13, the airbag 11 can restrain the chest of the occupant M with the surface of the second chamber 13.

Accordingly, the airbag 11 of this embodiment can reduce compression of the chest of the occupant M by a seat belt 9 upon the vehicle 1 being subjected to an impact due to a collision, so that safety when the vehicle 1 is subjected to an impact can be improved.

Further, the first extension portion 14a and the second extension portion 14b of the airbag 11 of this embodiment are inflated and expanded to extend rearward in the vehicle front-rear direction. Then, the inflated and expanded first extension portion 14a and second extension portion 14b of the airbag 11 cover the sides of the head of the occupant M.

If the collision of the vehicle 1 that has caused the impact is a front collision, it is highly likely that the head of the occupant M will be protected by the portion in the vicinity of the center of the first chamber 12. On the other hand, if the collision of the vehicle 1 that has caused the impact is a side collision, it is highly likely that the head of the occupant M will be protected by the portion in the vicinity of the periphery of the first chamber 12.

Since the airbag 11 of this embodiment includes the first extension portion 14a and the second extension portion 14b at the opposing edges of the first chamber 12 in the vehicle width direction, even if the collision of the vehicle 1 that has caused the impact is a side collision, the head of the occupant M can be protected by the first extension portion 14a and the second extension portion 14b. This makes it possible to make the impact values of impacts exerted by the airbag 11 in different types of collision more uniform.

As described above, according to the airbag device 10 of this embodiment, it is possible to make the values of impacts exerted by the airbag 11 in different types of collision more uniform, so that the safety in protecting the occupant M from the impact due to the collision of the vehicle 1 can be improved.

Modified Example 1 of Embodiment 1

Figure 6:
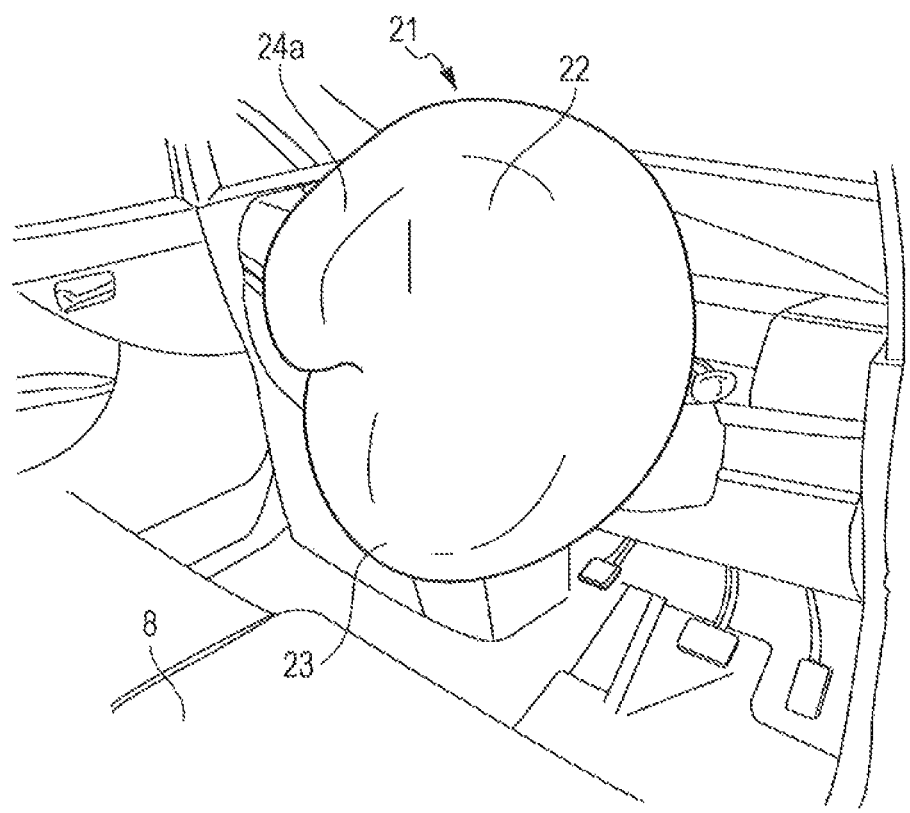
FIG. 6 is a schematic view showing a cabin of a vehicle to which an occupant protection device of Modified Example 1 of Embodiment 1 of the present invention is applied, and more specifically is a perspective view showing an airbag of the occupant protection device in an inflated and expanded state.
Figure 7:
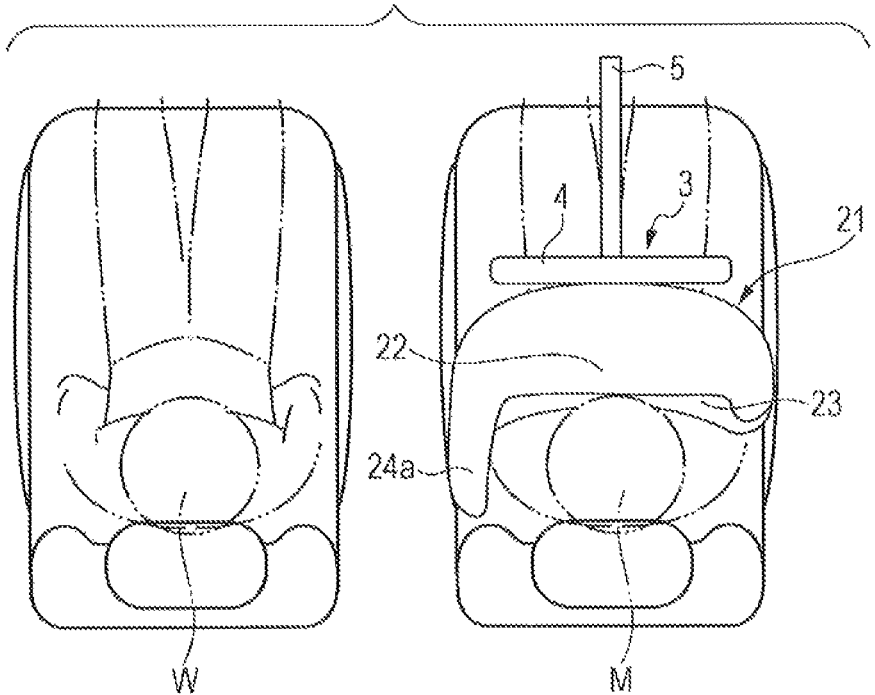
FIG. 7 is a schematic view showing the cabin of the vehicle to which the occupant protection device of Modified Example 1 of Embodiment 1 of the present invention is applied, and more specifically is a top view illustrating effects of the airbag produced on the occupant upon the vehicle being subjected to an impact when the vehicle is viewed from an upper side in a vertical direction of the vehicle.

Next, a description is given of Modified Example 1 of Embodiment 1 with reference to FIGS. 6 and 7. First, a description, is given of an airbag 21 of an airbag device 20 of this modified example with reference to FIG. 6. FIG. 6 is a schematic view showing a cabin 2 of a vehicle 1 to which the airbag device 20 of Modified Example 1 of Embodiment 1 of the present invention is applied. More specifically, FIG. 6 is a perspective view showing the airbag 21 of the airbag device 20 in an inflated and expanded state.

This airbag device 20 is the same as that of the above Embodiment 1 except for the shape of the airbag 21 in the inflated and expanded state. Accordingly, the elements corresponding to those of the above Embodiment 1 are referred to by the same reference numerals, and a description thereof is omitted.

As illustrated in FIG. 6, the airbag 21 of the airbag device. 20 of this modified example includes a first chamber (head protection chamber) 22 and a second chamber (chest protection chamber) 23.

The airbag 21 further includes, at a cabin-side edge of the first chamber 22 in the vehicle width direction, an extension portion (side protection chamber) 24a that is inflatable and expandable to extend rearward in the vehicle front-rear direction.

As mentioned above, this extension portion 24a is disposed at the cabin-side edge of the first chamber 22 in the vehicle width direction, and is formed to extend rearward in the vehicle front-rear direction. That is, the extension portion 24a of this modified example is formed to inflatable and expandable between the occupant M and an occupant W.

Since the extension portion 24a is formed to be inflatable and expandable between the occupant M and the occupant W, the airbag device 20 of this modified example can prevent the occupant M from striking the occupant W.

In this way, since the airbag device 20 of this modified example prevents the occupant M from striking the occupant W, the injury value in impact due to collision of the vehicle 1 can be reduced, so that safety when the vehicle 1 is subjected to an impact can be improved.

Next, a description is given of effects of the airbag 21 produced on the occupant M upon the vehicle 1 to which the airbag device 20 of this modified example is applied being subjected to an impact due to a collision with reference to FIG. 7. FIG. 7 is a schematic view showing the cabin 2 of the vehicle 1 to which the airbag device 20 of Modified Example 1 of Embodiment 1 of the present invention is applied. More specifically, FIG. 7 is a top view illustrating effects of the airbag 21 produced on the occupant M upon the vehicle 1 being subjected to an impact when the vehicle 1 is viewed from an upper side in a vertical direction of the vehicle 1.

As shown in FIG. 7, the extension portion 24a of the airbag 21 is inflated and expanded to extend rearward in the vehicle front-rear direction. Then, the inflated and expanded extension portion 24a covers a side of the head of the occupant M.

If the collision of the vehicle 1 that has caused the impact is a front collision, it is highly likely that the head of the occupant M will be protected by the portion in the vicinity of the center of the first chamber 22. On the other hand, if the collision of the vehicle 1 that has caused the impact is a side collision, it is highly likely that the head of the occupant M will be protected by the portion in the vicinity of the periphery of the first chamber 22.

Since the airbag 21 of this modified example includes the extension portion 24a at the cabin-side edge of the first chamber 12 in the vehicle width direction, even if the collision of the vehicle 1 that has caused the impact is a side collision, it is possible to prevent the occupant M from striking the occupant W.

In this way, since the airbag 21 of the airbag device 20 of this modified example prevents the occupant M from striking the occupant W, the impact value in impact on the vehicle 1 can be reduced, so that safety when the vehicle 1 is subjected to an impact can be improved.

Modified Example 2 of Embodiment 1

Figure 8:
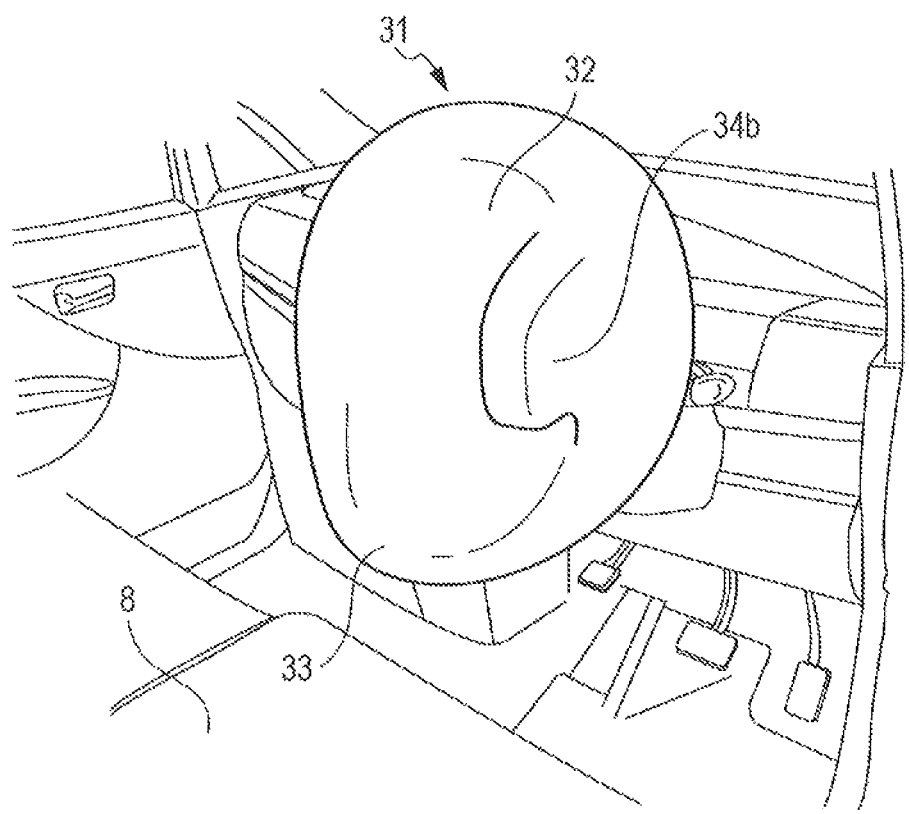
FIG. 8 is a schematic view showing a cabin of a vehicle to which an occupant protection device of Modified Example 2 of Embodiment 1 of the present invention is applied, and more specifically is a perspective view showing an airbag of the occupant protection device in an inflated and expanded state.
Figure 9:
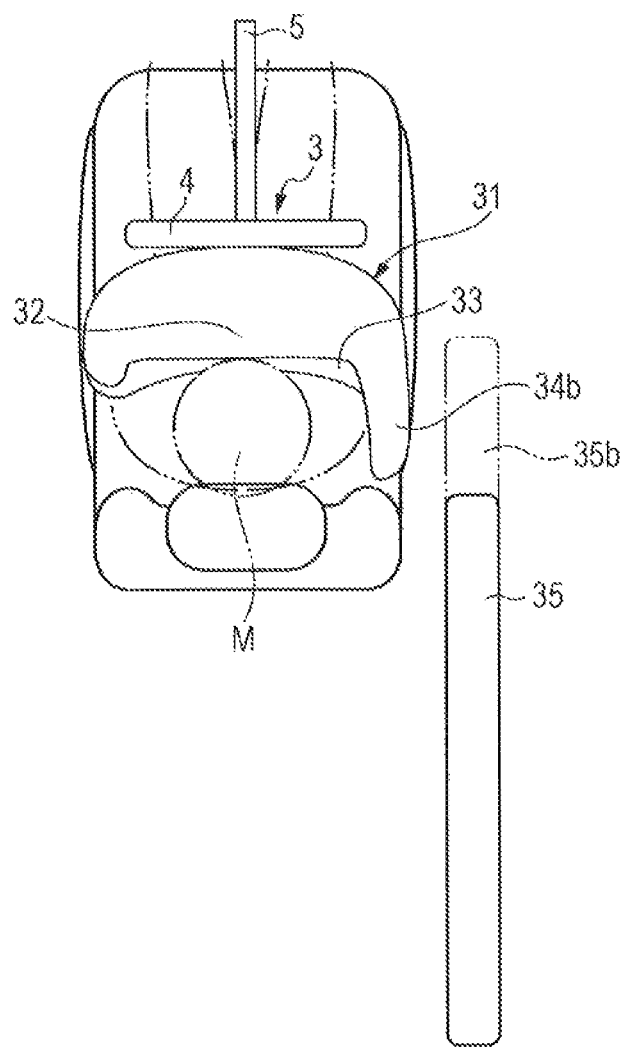
FIG. 9 is a schematic view showing the cabin of the vehicle to which the occupant protection device of Modified Example 2 of Embodiment 1 of the present invention is applied, and more specifically is a top view illustrating effects of the airbag produced on the occupant upon the vehicle being subjected to an impact when the vehicle is viewed from an upper side in a vertical direction of the vehicle.

Next, a description is given of Modified Example 2 of Embodiment 1 with reference to FIGS. 8 and 9. First, description is given of an airbag 31 of this modified example with reference to FIG. 8. FIG. 8 is a schematic view showing a cabin 2 of a vehicle 1 to which an airbag device 30 of Modified Example 2 of Embodiment 1 of the present invention is applied. More specifically, FIG. 8 is a perspective view showing the airbag 31 of the airbag device 30 in an inflated and expanded state.

This airbag device 30 is the same as that of the above Embodiment 1 except for the shape of the airbag 31 in the inflated and expanded state. Accordingly, the elements corresponding to those of the above Embodiment 1 are referred to by the same reference numerals, and a description thereof is omitted.

As illustrated in FIG. 8, the airbag 31 of the airbag device 30 of this modified example includes a first chamber (head protection chamber) 32 and a second chamber (chest protection chamber) 33.

Further, an extension portion (side protection chamber) 34b that is inflatable and expandable to extend rearward in the vehicle front-rear direction is formed at an outdoor-side edge of the first chamber 32 in the vehicle width direction.

As mentioned above, this extension portion 34b is disposed at an outdoor-side edge of the first chamber 32 in the vehicle width direction, and is formed to extend rearward in the vehicle front-rear direction. That is, the extension portion 34b of this modified example is formed to be inflatable and expandable between the occupant M and a side door.

Since the extension portion 34b is formed to be inflatable and expandable between the occupant M and the side door, the airbag device 30 of this modified example can prevent the occupant M from striking the side door M upon the vehicle 1 being subjected to an impact due to a collision.

Further, the airbag 30 of this modified example can prevent the occupant M from being thrown out of the vehicle 1. That is, according to the airbag 30 of this modified example, the extension portion 34b serves as a part of a curtain airbag 35, which makes it possible to reduce the area of the curtain airbag, 35.

Thus, the airbag device 30 of this modified example allows a front pillar storing the curtain airbag 35 (in particular, a front chamber 35b of the curtain airbag 35) to be thinner, and thereby allows the vision of the occupant M to be expanded.

As described above, since the extension portion 34b serves as a part of the curtain airbag 35, the airbag device 30 of this modified example allows the vision of the occupant M to be expanded. Therefore, the safety during driving can be improved.

Next, a description is given of effects of the airbag 31 produced on the occupant M upon the vehicle 1 to which the airbag device 30 of this modified example is applied being subjected to an impact due to a collision with reference to FIG. 9. FIG. 9 is a schematic view showing the cabin 2 of the vehicle 1 to which the airbag device 30 of Modified Example 2 of Embodiment 1 of the present invention is applied. More specifically, FIG. 9 is a top view illustrating effects of the airbag 31 produced on the occupant M, upon the vehicle 1 being subjected to an impact when the vehicle 1 is viewed from an upper side in a vertical direction of the vehicle 1.

As shown in FIG. 9, the extension portion 34b of the airbag 31 is inflated and expanded to extend rearward in the vehicle front-rear direction. Then, the inflated and expanded extension portion 34b covers a side of the head of the occupant M.

If the collision of the vehicle 1 that has caused the impact is a front collision, it is highly likely that the head of the occupant M will be protected by the portion in the vicinity of the center of the first chamber 32. On the other hand, if the collision of the vehicle 1 that has caused the impact is a side collision, it is highly likely that the head of the occupant M will be protected by the portion in the vicinity of the periphery of the first chamber 32.

Since the airbag. 31 of this modified example includes the extension portion 34b at the outdoor-side edge of the first chamber 32 in the vehicle width direction, even if the collision of the vehicle 1 that has caused the impact is a side collision, it is possible to prevent the occupant M from striking the side door.

In this way, since the airbag device 30 of this modified example prevents the occupant M from striking the side door, it is possible to prevent the occupant M from being thrown out of the vehicle 1.

That is, according to the airbag device 30 of this modified embodiment, since the extension portion 34b can serve as a part of the curtain airbag 35, it is possible to reduce the area of the curtain airbag 35.

Thus, the airbag device 30 of this modified example allows the front pillar storing the curtain airbag 35 (in particular, the front chamber 35b of the curtain airbag 35) to be thinner, and thereby allows the vision of the occupant M to be expanded.

As described above, since the extension portion 34b serves as a part of the curtain airbag 35, the airbag device 30 of this modified example allows the vision of the occupant M to be expanded. Therefore, the safety during driving can be improved.

Embodiment 2

Figure 10:
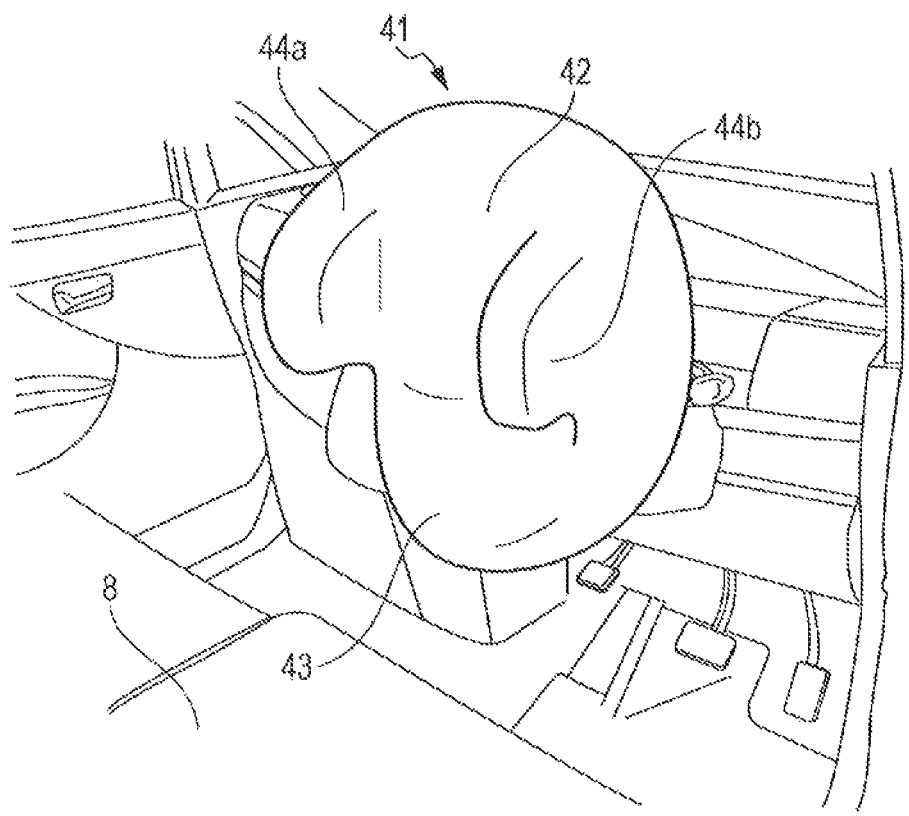
FIG. 10 is a schematic view showing a cabin of a vehicle to which an occupant protection device of Embodiment 2 of the present invention is applied, and more specifically is a perspective view showing an airbag of the occupant protection device in an inflated and expanded state.
Figure 11:
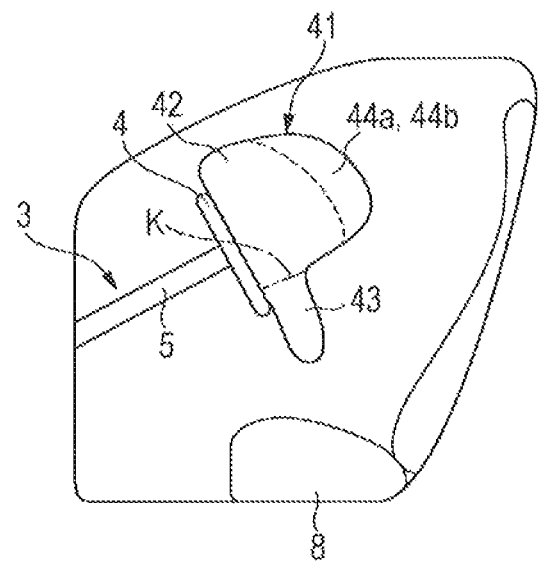
FIG. 11 is a schematic view showing the cabin of the vehicle to which the occupant protection device of Embodiment 2 of the present invention is applied, and more specifically is a side view showing the airbag of the occupant protection device in the inflated and expanded state when the vehicle is viewed from one side in a width direction of the vehicle.
Figure 12:
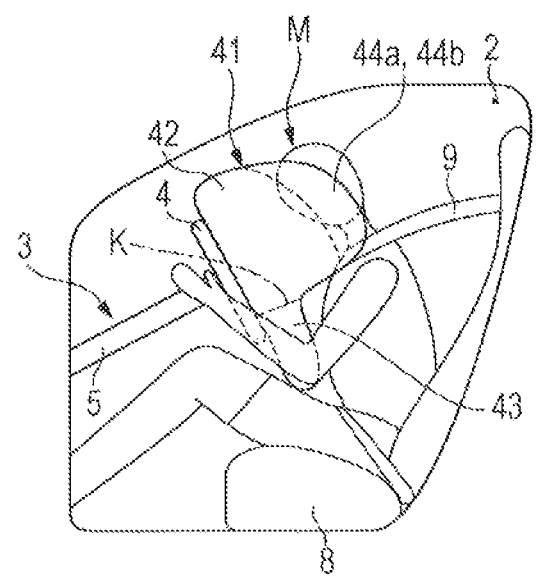
FIG. 12 is a side view illustrating effects of the airbag produced on the occupant upon the vehicle being subjected to an impact according to FIG. 11.

Next, a description is given of an airbag device 40 of Embodiment 2 with reference to FIGS. 10 through 12. First, a description is given of an airbag 41 of this embodiment with reference to FIGS. 10 and 11.

FIG. 10 is a schematic view showing a cabin 2 of a vehicle 1 to which the airbag device 40 of Embodiment 2 of the present invention is applied. More specifically, FIG. 10 is a perspective view showing the airbag 41 of the airbag device 40 in an inflated and expanded state.

Further, FIG. 11, is a schematic view showing the cabin 2 of the vehicle 1 to which the airbag device 40 of Embodiment 2 of the present invention is applied. More specifically, FIG. 11 is a side view showing the airbag 41 of the airbag device 40 in the inflated and expanded state when the cabin 2 is viewed from one side in a width direction of the vehicle 1.

This airbag device 40 is the same as that of the above Embodiment 1 except that a first chamber (head protection chamber) 42 has a greater inflated length extending rearward in the vehicle front-rear direction than a second chamber (chest protection chamber) 43. Accordingly, the elements corresponding to those of the above Embodiment 1 are referred to by the same reference numerals, and a description thereof is omitted.

As shown in FIGS. 10 and 11, the airbag 41 of the airbag device 40 of this embodiment includes the first chamber 42 and the second chamber 43. Further, a first extension portion (side protection chamber) 44a and a second extension portion 44b that are inflatable and expandable to extend rearward in the vehicle front-rear direction are formed at the opposing edges of the first chamber 42 in the vehicle width direction.

It should be noted that although the first extension portion 44a and the second extension portion 44b are formed at the opposing edges of the first chamber 42 in the vehicle width direction, the configuration of the airbag 41 of this embodiment is not limited to this configuration. As in the case of the above Modified Examples 1 and 2 of Embodiment 1, either one of the first extension portion 44a and the second extension portion. 44b may be formed.

In this embodiment, the first chamber 92 and the second chamber 43 are formed, to be inflatable and expendable to have inflated lengths different from each other. More specifically, the first chamber 42 has a greater projecting length toward the occupant M than the second chamber 43.

That is, in the airbag 41 of this embodiment, the first chamber 42 for protecting the head of the occupant M has a greater projecting length toward the occupant M than the second chamber 43 for protecting the chest of the occupant M.

With, regard to use of the seat belt 9, although seat belt use is mandatory in Japan, it is not mandatory in some other countries. In the case where the vehicle 1 is used in the countries. Where seat belt use is not mandatory, there is little risk of chest compression by the seat belt 9 upon the vehicle 1 being subjected to an impact due to a collision, and therefore head protection is given priority over chest protection.

In the airbag 41 of this embodiment, since the first chamber 42 for protecting the head of the occupant M has a greater projecting length toward the occupant M than the second chamber 43 for protecting the chest of the occupant M, it is possible to protect the head of the occupant M at an earlier time at the time of expansion of the airbag 41.

As described above, since the airbag 41 of this embodiment can protect the head of the occupant M at an earlier time than the chest of the occupant M at the time of expansion of the airbag 41, safety when the vehicle 1 is subjected to an impact can be improved in the case where the vehicle 1 is used in the countries where the use of the seat belt 9 is not mandatory.

Next, a description is given of effects of the airbag 41 produced on the occupant M upon the vehicle 1 to which the airbag device 40 of this embodiment is applied being subjected to an impact due to a collision with reference to FIG. 12. FIG. 12 is a side view illustrating effects of the airbag 41 produced on the occupant M upon the vehicle 1 being subjected to an impact according to FIG. 11.

Referring to FIG. 12, the airbag 41 of this embodiment is inflated and expanded with a gas supplied from an inflator (not shown). Then, since the airbag 41 has the first chamber 42 and the second chamber 43, the first chamber 42 is inflated and expanded to protect the head, and the second chamber 43 is inflated and expanded to protect the chest.

When the first chamber 42 and the second chamber 43 are inflated and expanded, an inflated length of the first chamber 42 in the vehicle front-rear direction is greater than an inflated length of the second chamber 43 in the vehicle front-rear direction.

Thus, the airbag 41 of this embodiment protects the head of the occupant M with the first chamber 42 first. Thus, the airbag 41 of this embodiment can provide improved safety when the vehicle 1 is subjected to an impact in the case where the vehicle 1 is used in the countries where use of the seat belt 9 is not mandatory.

Embodiment 3

Figure 13:
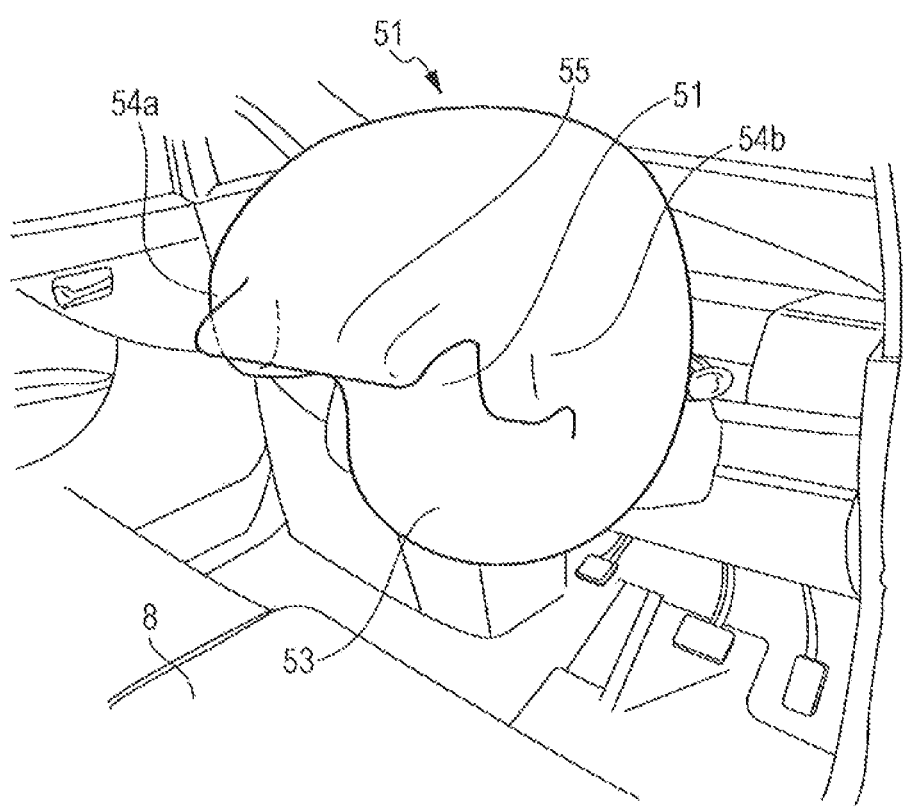
FIG. 13 is a schematic view showing a cabin of a vehicle to which an occupant protection device of Embodiment 3 of the present invention is applied, and more specifically is a perspective view showing an airbag of the occupant protection device in an inflated and expanded state.
Figure 14:
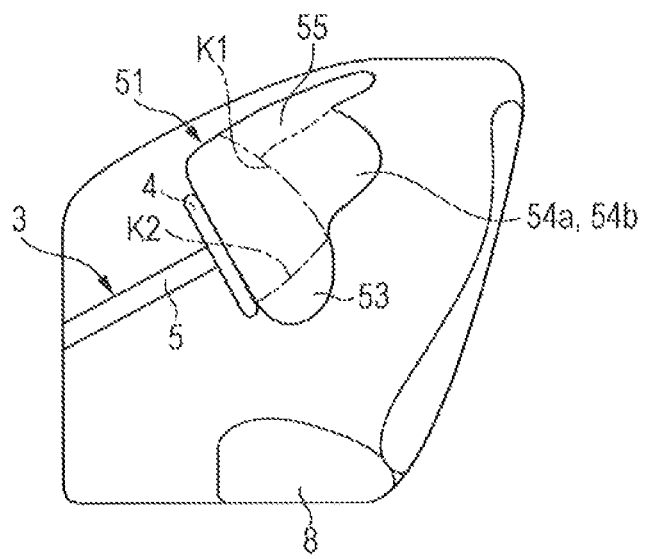
FIG. 14 is a schematic view showing the cabin of the vehicle to which the occupant protection device of Embodiment 3 of the present invention is applied, and more specifically is a side view showing the airbag of the occupant protection device in the inflated and expanded state when the vehicle is viewed from one side in a width direction of the vehicle.
Figure 15:
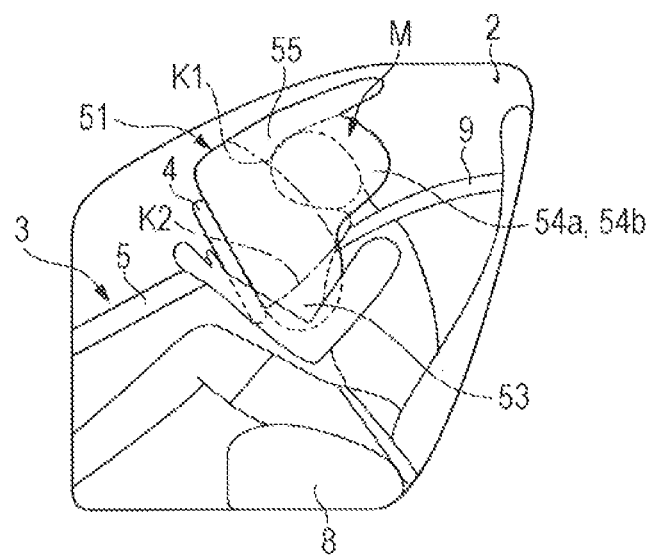
FIG. 15 is a side view illustrating effects of the airbag produced on the occupant upon the vehicle being subjected to an impact according to FIG. 14.

Next, a description is given of an airbag device 50 of Embodiment 3 with reference to FIGS. 13 through 15. First, a description is given of an airbag 51 of the airbag device 50 of this embodiment with reference to FIGS. 13 and 14.

FIG. 13 is a schematic view showing a cabin 2 of a vehicle 1 to which the airbag device 50 of Embodiment 3 of the present invention is applied. More specifically, FIG. 13 is a perspective view showing the airbag 51 of the airbag device 50 in an inflated and expanded state.

Further, FIG. 14 is a schematic view showing the cabin 2 of the vehicle 1 to which the airbag device 50 of Embodiment 3 of the present invention is applied. More specifically, FIG. 14 is a side view showing the airbag 51 of the airbag device 50 in the inflated and expanded state when the cabin 2 is viewed from one side in a width direction of the vehicle 1.

As shown in FIGS. 13 and 14, the airbag 51 of this embodiment includes a first chamber 52 and a second chamber 53. Further, a first extension portion side protection chamber) 54a and a second extension portion 54b that are inflatable and expandable to extend rearward in the vehicle front-rear direction are formed at the opposing edges of the first chamber 52 in the vehicle width direction.

It should be noted that although the first extension portion 54a and the second extension portion 54b are formed at the opposing edges of the first chamber 52 in the vehicle width direction, the configuration of the airbag 51 of this embodiment is not limited to this configuration. As in the case of the above Modified Examples 1 and 2 of Embodiment 1, either one of the first extension portion 54a and the second extension portion 54b may be formed.

In this embodiment, a third extension portion 55 that is inflatable and expandable to extend rearward in the vehicle front-rear direction in a similar manner as the first extension portion 54a and the second extension portion 54b is formed at an upper edge of the first chamber 52 in the vehicle vertical direction.

This third extension portion 55 is inflatable and expandable to cover the head of the occupant M. That is, the third extension portion 55 serves to protect the upper side of the head of the occupant M. Accordingly, the airbag 51 of this embodiment can prevent, by the third extension portion 55, the occupant M from striking the ceiling of the cabin 2 upon the vehicle 1 being subjected to an impact due to a collision.

Further, since the airbag 51 of this embodiment protects the upper side of the occupant M with the third extension portion 55, safety in the event of an overturn of the vehicle 1 (so-called "rollover") upon impact due to a collision of the vehicle 1 can be improved, for example.

Next, a description is given of effects of the airbag 51 produced on the occupant M upon the vehicle 1 to which the airbag device 50 of this embodiment is applied being subjected to an impact due to a collision with reference to FIG. 15. FIG. 15 is a side view illustrating effects of the airbag 51 produced on the occupant M upon the vehicle 1 being subjected to an impact according to FIG. 14.

Referring to FIG. 15, the airbag 51 of this embodiment is inflated and expanded with a gas supplied from an inflator (not shown). Then, since the airbag 51 has the first chamber 52 and the second chamber 53, the first chamber 52 is inflated and expanded to protect the head, and the second chamber 53 is inflated and expanded to protect the chest.

In this embodiment, since the third extension portion 55 that protects the upper side of the head of the occupant M is formed on an upper side in the vehicle vertical direction of the airbag 51, it is possible to prevent the occupant M from striking the ceiling of the cabin 2 upon the vehicle 1 being subjected to an impact due to a collision.

Further, as described above, since third extension portion 55 of the airbag 51 of this embodiment protects the upper side of the occupant M, safety in the event of an overturn of the vehicle 1 (so-called "rollover") upon impact due to a collision of the vehicle 1 can be improved, for example.

The invention claimed is:

1. An occupant protection device comprising:
   an airbag that is stored in a center pad of a steering wheel of a vehicle and is expandable toward an occupant side upon an impact due to a collision of the vehicle, wherein
   the center pad is disposed to have a non-rotating structure independent from the steering wheel;
   the airbag includes an extension portion disposed on at least one edge of the airbag in a width direction of the vehicle and expandable to extend toward a rear side of the vehicle;
   the airbag further includes at least a head protection portion that protects a head of the occupant, and a chest protection portion that protects a chest of the occupant;
   the extension portion disposed on at least one edge of the airbag in a width direction of the vehicle is disposed in the head protection portion; and
   the airbag further includes an extension portion disposed at an upper edge of the airbag and expandable to extend toward a rear side of the vehicle to cover a top of the occupant's head.

2. The occupant protection device according to claim 1, wherein the head protection portion and the chest protection portion are expandable to have different thicknesses from each other in a front-rear direction of the vehicle.

3. The occupant protection device according to claim 2, wherein the airbag includes at least two extension portions disposed at opposing edges of the airbag in the width direction of the vehicle which extension portions are expandable to cover a head of an occupant.

4. The occupant protection device according to claim 2, wherein the extension portion disposed on at least one edge of the airbag in a width direction of the vehicle is disposed at an outdoor-side edge of the airbag in the width direction of the vehicle and is expandable between an occupant and a window of the vehicle.

5. The occupant protection device according to claim 2, wherein the chest protection portion is expandable to have greater projecting length in a front-rear direction of the vehicle than the projecting length of the head protection portion.

6. The occupant protection device according to claim 1, wherein the airbag includes at least two extension portions disposed at opposing edges of the airbag in the width direction of the vehicle which extension portions are expandable to cover a head of an occupant.

7. The occupant protection device according to claim 1, wherein the extension portion disposed on at least one edge of the airbag in a width direction of the vehicle is disposed at an outdoor-side edge of the airbag in the width direction of the vehicle and is expandable between an occupant and a window of the vehicle.

8. The occupant protection device according to claim 1, wherein the extension portion disposed on at least one edge of the airbag in a width direction of the vehicle is disposed at a cabin-side edge of the airbag in the width direction of the vehicle and is expandable between an occupant in a driver seat and an occupant in a passenger seat.

9. The occupant protection device according to claim 2, wherein the extension portion disposed on at least one edge of the airbag in a width direction of the vehicle is disposed at a cabin-side edge of the airbag in the width direction of the vehicle and is expandable between an occupant in a driver seat and an occupant in a passenger seat.

10. An occupant protection device comprising:
an airbag that is stored in a center pad of a steering wheel of a vehicle and is expandable toward an occupant side upon an impact due to a collision of the vehicle, wherein
the center pad is disposed to have a non-rotating structure independent from the steering wheel;
the airbag includes a first extension portion disposed on at least one edge of the airbag in a width direction of the vehicle and expandable to extend toward a rear side of the vehicle;
the first extension portion is configured, upon expanding and extending toward the rear side of the vehicle, to pass over the occupant's shoulder and extend along the side of the occupant's head;
the airbag further includes a second extension portion disposed on an opposing edge of the airbag from the first extension portion, the second extension portion configured to pass over the occupant's shoulder and extend along the side of the occupant's head upon expanding to extend toward a rear side of the vehicle; and
the airbag further includes a third extension portion expandable to extend toward a rear side of the vehicle, the third extension portion being disposed on an upper edge of the airbag.

11. The occupant protection device according to claim 10, wherein
a first end of the third extension portion is directly joined to a top end of the first extension portion, and a second end of the third extension portion is directly joined to a top end of the second extension portion.

12. An occupant protection device comprising:
an airbag that is stored in a center pad of a steering wheel of a vehicle and is expandable toward an occupant side upon an impact due to a collision of the vehicle, wherein
the center pad is disposed to have a non-rotating structure independent from the steering wheel;
the airbag includes an extension portion disposed on at least one edge of the airbag in a width direction of the vehicle and expandable to extend toward a rear side of the vehicle;
the airbag further includes at least a head protection portion that protects a head of the occupant, and a chest protection portion that protects a chest of the occupant;
the extension portion disposed on at least one edge of the airbag in a width direction of the vehicle is disposed in the head protection portion;
the head protection portion and the chest protection portion are expandable to have different thicknesses from each other in a front-rear direction of the vehicle; and
the head protection portion is expandable to have greater projecting length in a front-rear direction of the vehicle than the projecting length of the chest protection portion.

13. The occupant protection device according to claim 12, wherein the airbag further includes an extension portion disposed at an upper edge of the airbag and expandable to extend toward a rear side of the vehicle to cover a top of the occupant's head.

* * * * *